United States Patent [19]

Wiesmeier

[11] Patent Number: 4,747,651

[45] Date of Patent: May 31, 1988

[54] THREE-WAY START SPLITTER FOR OPTICAL WAVE GUIDES

[75] Inventor: Albert Wiesmeier, Merlingen, Fed. Rep. of Germany

[73] Assignee: Daimler-Benz Aktiengesellschaft, Stuttgart, Fed. Rep. of Germany

[21] Appl. No.: 839,601

[22] Filed: Mar. 14, 1986

[30] Foreign Application Priority Data

Mar. 14, 1985 [DE] Fed. Rep. of Germany ....... 3509053

[51] Int. Cl.$^4$ .............................................. G02B 6/26
[52] U.S. Cl. ............................ 350/96.15; 350/96.18
[58] Field of Search ............... 350/96.11, 96.12, 96.13, 350/96.14, 96.15, 96.16, 96.17, 96.18, 96.19, 96.20, 96.21, 96.22

[56] References Cited

FOREIGN PATENT DOCUMENTS

| 3324611 | 1/1985 | Fed. Rep. of Germany | 350/96.16 |
| 3324161 | 1/1985 | Fed. Rep. of Germany | 350/96.15 |
| 43751 | 4/1979 | Japan | 350/96.15 |
| 126201 | 9/1980 | Japan | 350/96.20 |
| 51703 | 5/1981 | Japan | 350/96.13 |
| 107201 | 8/1981 | Japan | 350/96.19 |
| 161827 | 10/1982 | Japan | 350/96.14 |
| 188922 | 9/1985 | Japan | 350/96.14 |

Primary Examiner—William L. Sikes
Assistant Examiner—Frank González
Attorney, Agent, or Firm—Barnes & Thornburg

[57]  ABSTRACT

A bidirectional three-way star splitter for optical wave guides having coupler connections for the optical wave guides and output and input coupling elements between the individual coupler connections. Three coupling elements are provided and include a plane-parallel glass or synthetic glass element of homogeneous composition. Additionally, each coupling element has a longitudinal inside surface which is constructed as a plane reflector and a longitudinal outside surface which is constructed as an elliptical reflector, the two longitudinal surfaces being joined at both ends by planar coupling surfaces adjoining the respective optical wave guides.

26 Claims, 2 Drawing Sheets

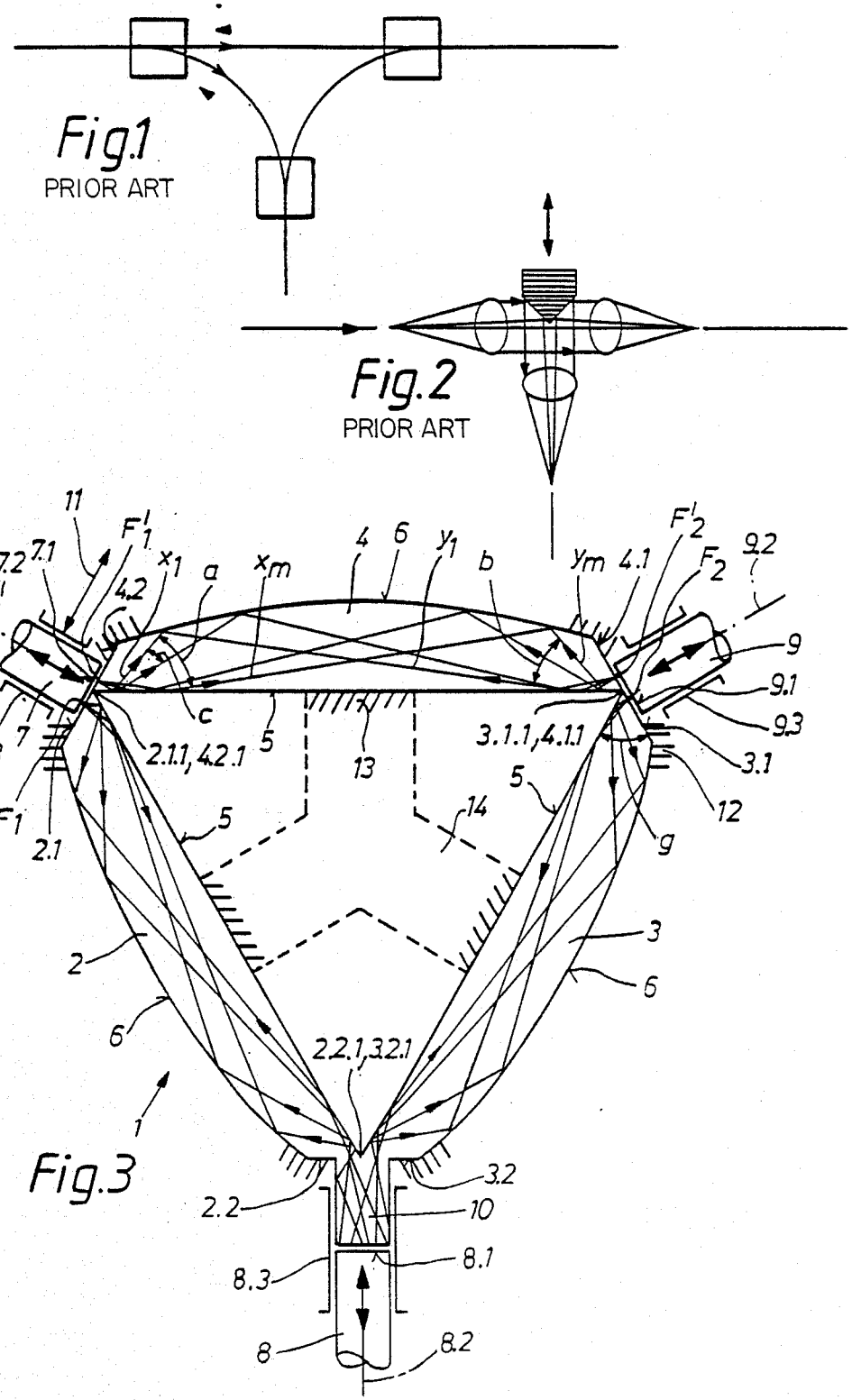

THREE-WAY START SPLITTER FOR OPTICAL WAVE GUIDES

BACKGROUND AND SUMMARY OF THE INVENTION

The invention relates to a bidirectional three-way star splitter for optical wave guides.

The existence of bidirectional star-splitters is generally a prerequisite for implementing fiber-optical bus systems for data transmission. They can be used, for example, to connect a subscriber device with bidirectional transmitting and receiving capability to a fiber-optic data line.

In German Published Unexamined Patent Application (DE-OS) No. 33 24 161, so called Y or T couplers are referred to in which two part luminous fluxes are combined into a single luminous flux via a gradient lens coupling element. In addition to this means of combining luminous fluxes, Y-couplers are also described in which two fibers are combined into a single fiber by fusing or bonding. The thermal softening, twisting and stretching of the fibers, however, requires considerable manual skill in production thereby excluding the possibility of automation. Additionally, not all connections of a Y-coupler can communicate with each other with the same level of priority. A bidirectional star splitter can be built only by using three Y-couplers as shown in FIG. 1 depicting the functional difference between Y-couplers and three-way star splitters.

In German Published Unexamined Patent Application (DE-OS) No. 33 24 611, a three-way star splitter is described in which the fiber is split up and a part of the light is coupled into another fiber by means of a reflective 90° prism. The parallel beam path necessary for this is generated by three lenses as shown in FIG. 2.

Although this arrangement has the advantage that the degree of input and output coupling is continuously variable by moving the prisms, the high mechanical expenditure involved with the adjustability of the lenses prohibits mass production at a low price. Also for optically related reasons, a low-loss output coupling is possible only to approximately 50%, at least in the case of the three similar fiber connections as shown in FIG. 2. The advantage of the variable degree of output coupling can also be achieved by using an appropriately manufactured coupler having a fixed degree of output coupling.

An object of the present invention is to provide a bidirectional three-way star splitter for optical wave guides which is universally usable with low losses and can be simply and inexpensively produced in large numbers.

It is another object of the present invention to provide a star splitter which is combinable with other star splitters for implementing arbitrary bidirectional branching.

The above and other objects are attained by a three way star splitter arrangement having coupling elements positioned between the end front faces of a plurality of wave guides. These coupling elements each have a longitudinal inside surface coupled to a longitudinal outside surface at both ends by a planar coupler surface. The planar coupler surfaces extend parallel to the front end faces of the respectively adjoining optical wave guides. The planar coupler surface also forms at each end of the respective coupling elements, an enclosed acute angle with the respectively adjoining longitudinal inside surfaces.

In a particular preferred embodiment of the invention, the longitudinal inside surfaces are abuttingly joined to each other defining a line of intersection therebetween. These lines of intersection are aligned with the optical axis of the respectively adjoining optical wave guide.

The three-way star splitter of the present invention is particularly suitable for installation in inexpensive fiber-opticle bus systems. For this purpose, a specially preferred embodiment includes synthetic fibers for optical wave guides having diameters of 1 mm. Another preferred embodiment includes so-called thick-core fibers of glass or quartz for fibers having diameters of 0.5 mm. Coupling elements can be inexpensively produced in large numbers for these guides using injection molding methods. The surface quality achieved by these methods is adequate for data transmission purposes.

The present invention has the advantage of providing a light path in such a way that dividing and focusing of the beam of rays occurs completely inside a planar synthetic part (coupling element) having a homogeneous composition. The beam directions are influenced exclusively by the effect of total internal reflection at the interface between the synthetic part and the air. Surface treatment such as, for example, vapor deposition of reflecting layers thus becomes no longer necessary. If defraction effects are neglected, it is always possible because of the limited cone of radiation of the optical wave guide, to find points in the synthetic part which are located in the shadow, and can therefore be utilized for mounting the otherwise freely suspended synthetic part.

Since the inside and outside surfaces are substantially parallel to each other and the step of the refraction index between the synthetic part and air is always greater than that between the core and the sheath of the optical wave guide, total internal reflection always occurs in the vertical or transverse direction in the synthetic part. The propagation of the beams in the transverse direction is, therefore, limited to the height of the synthetic element which is, in a preferred embodiment, identical to the diameter of the core of the optical wave guide.

Since the reflection at the longitudinal surfaces of the coupling element is also intended to occur as total internal reflection, certain critical angles must be maintained. In this context, the elliptical reflector is designed to have an aperture angle of a cone of radiation of an incident light beam to be approximately equal to the aperture angle of a cone of radiation of the reflected light beam. Also the main object distance of the light rays is made to be approximately equal to the mean image distance. Additionally, the longitudinal inside surface of the coupling elements are located between the focal points of the respective elliptical reflection and the longitudinal outside surfaces of the respective coupling elements. The reflected focal points of the elliptical reflections are provided on the respective coupler surfaces. In a preferred embodiment, the numeric aperture for the optical wave guide is 0.53 and a refractive index, n, for the coupling element is 1.5.

Further objects, features, and advantages of the present invention will become more apparent from the following description when taken with the accompanying drawings which show, for purposes of illustration only, an embodiment in accordance with the present invention.

BRIEF DESCRIPTION OF THE DRAWINGS

FIG. 1 is a prior art bidirectional three-way star splitter consisting of Y-couplers;

FIG. 2 is a prior art bidirectional three-way star splitter arrangement comprising a 90° prism;

FIG. 3 is a top view of a bidirectional three-way star splitter according to the present invention.

DETAILED DESCRIPTION OF THE DRAWINGS

Figure 4:
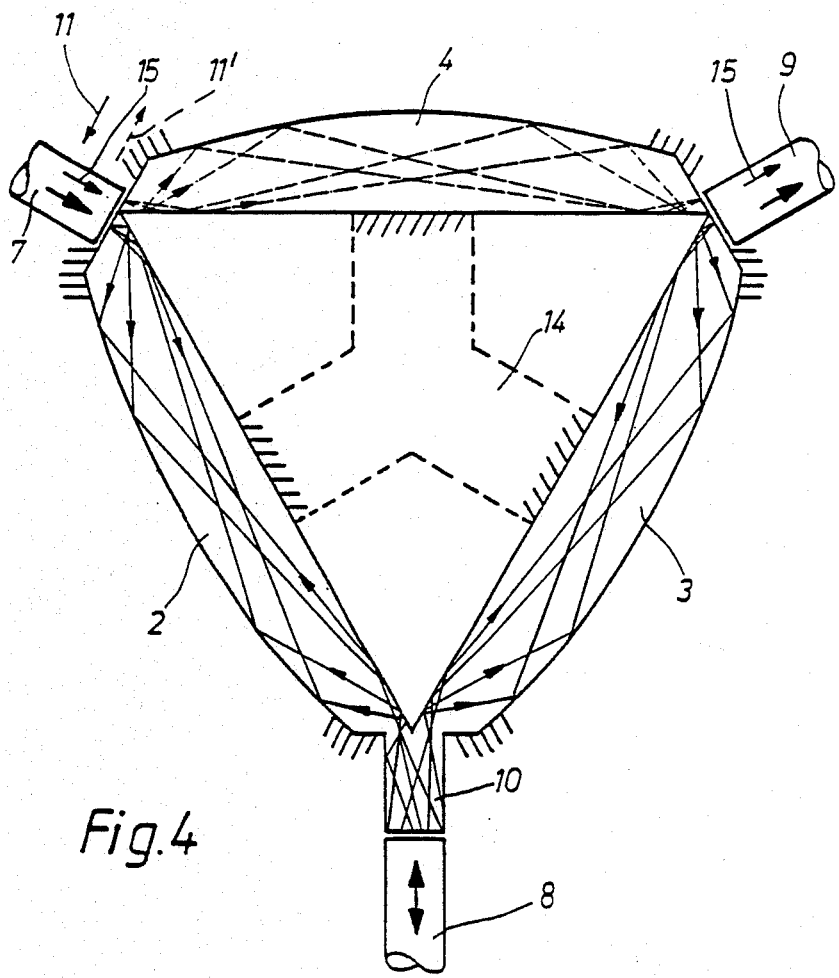
FIG. 4 is a top view of the three-way star splitter according to FIG. 3 constructed as a bidirectional Y-coupler having a cross talk function.

The bidirectional three-way star splitter 1, shown in FIG. 3, has three coupling elements 2, 3 and 4 which comprise plane-parallel glass or synthetic glass elements having a homogenous composition. The synthetic glass may be a transparent synthetic material, generally known by the term PMMA and commonly referred to as acrylic glass or polymethacrylate glass. Each coupling element has a longitudinal inside surface 5 constructed as a plane reflector and a longitudinal outside surface 6 constructed as an elliptical reflector. The longitudinal surfaces 5 and 6 of each coupling element are joined to each other by plane coupler surfaces 2.1, 2.2, 3.1, 3.2, 4.1, 4.2 which in each case enclose an acute angle g with respect to the associated longitudinal inside surface 5. In the preferred embodiment of FIG. 3, the three longitudinal inside surfaces form an equilateral triangle, having angles of 60°. In this preferred embodiment, lines of intersection 2.1.1–4.2.1, 2.2.1–3.2.1 and 3.1.1–4.1.1 are defined between the individual coupler surfaces and the respectively adjoining longitudinal inside surfaces 5. The individual coupler surfaces and the longitudinal inside surfaces 5 abut each other and are preferably integrally joined to each other so that the three coupling elements 2, 3 and 4 are integrally joined to each other as a single molded part. The coupler surfaces 2.1–4.1, 4.2–2.2, 3.2–3.1, abutting each other in each case, together also form a plane surface to which the front face 7.1, 8.1, 9.1 of the respectively adjoining optical wave guide 7, 8 and 9 extends in parallel. The alignment of the optical wave guides 7, 8 and 9 are such that the lines of intersection 2.1.1–4.2.1 are located on the optical axis 7.2 of the optical wave guide 7, the lines of intersection 2.2.1–3.2.1 are located on the optical axis 8.2 of the optical wave guide 8 and the lines of intersection 3.1.1–4.1.1 are located on the optical axis 9.2 the optical wave guide 9.

The longitudinal outside surface 6 which is constructed as an elliptical reflector, is designed for each coupling element 2, 3 and 4 in such a manner that the aperture angle, a, of the cone of radiation of the incident beam of light is equal to the aperture angle, b, of the cone of radiation of the reflected light beam. In addition, the mean object distance ($\Sigma x_i/m$) which is the sum of the lengths of all light rays ($x_l \ldots x_m$) emanating from the focal point $F_l$ divided by the number (m) of the light rays of the indicent light beam—is equal to the mean image distance ($\Sigma y_i/m$), which is the sum of the lengths of all light rays ($y_l \ldots y_m$) passing through the focal point $F_2$ divided by the number (m) of the light rays of the reflected light beam. Since reflection is to occur as total internal reflection, the angles of incidence of the light rays of the beam are greater than or equal to the critical angle of the total internal reflection. In a preferred embodiment using polymethacrylate glass for the coupling elements, the critical angle between the coupling element and the air is 42° with the numeric aperture of the optical wave guide being 0.53, the refractive index, n, of the material of the coupling elements being 1.5 and the resulting aperture angle C being 20°. In addition, the focal points $F_1$ and $F_2$ of the elliptical reflector 6 as shown for the coupling element 4 in FIG. 3, must also be selected to be such that they are located outside the longitudinal inside surface 5, while their reflected focal points $F_1'$ and $F_2'$ are located on the coupler surfaces 4.2 and 4.1. The contour of the elliptical reflector is thereby determined by the parameters given above.

In a preferred embodiment, the thickness of the coupling elements 2, 3 and 4 is equal to the diameter of the core of the optical wave guide 7, 8 and 9 while the length of the longitudinal inside surfaces 5 is approximately 8 to 15 times the diameter of the core of the optical wave guide. In a specially preferred embodiment, the length is 10 times the diameter.

The three connected optical wave guides 7, 8, 9 and the coupling elements 2, 3 and 4 are respectively identical to each other. Because of this identical construction and their arrangement as an equilateral triangle, minimum losses are guaranteed by the resulting rigidly symmetric beam path. In the preferred embodiment, the splitter ratio is equal to 0.5 and is equal for all three optical wave guide connections. Altered ellipse parameters can also be advantageous for different optical wave guides or different degrees of coupling. It is also contemplated according to certain embodiments of the invention to vary the splitter ratio by moving one or more of the coupler connections 7.3, 8.3, 9.3 of the optical wave guides 7, 8 and 9 in the direction of the arrow 11 and parallel to the two coupler surfaces 2.1–4.2, 2.2–3.2, 3.1–4.1, of the respective coupling elements 2, 3, and 4 adjoining the optical wave guide.

As shown in FIG. 3, a connecting piece of glass or synthetic glass 10, extends from the two coupler surfaces 2.2–3.2 in the direction of the optical wave guide 8. This extension is centered by the coupler connection 8.3 with respect to the optical wave guide 8 and is arranged at the coupler connection 8.3 of the optical wave guide 8. The outside dimensions of the connecting piece 10 correspond at least to the diameter of the core but at a maximum to the diameter of the sheath of the optical wave guide 8. The connecting piece 10 is advantageously integrally joined to the coupler surfaces 2.2–3.2 of the coupling elements 2 and 3 so that the unit consisting of the elements 2, 3, 4 and 10 can be produced as one part by the injection molding process. This connecting piece 10 ensures that part light beams coming from the optical wave guides 7 and 9 are mixed when the three-way star splitter is cascaded with another three-way star splitter. Star splitters of the type contemplated by the present invention provide for an arbitrary number of branches having many conceivable degrees of output coupling by cascading the three-way star splitters In FIG. 3, shaded areas 12 and 13 are also drawn which represent boundary zones which are relatively unimportant for the optical function due to the limited cones of radiation of the light beams in the coupling elements. These areas can be advantageously used for holding the coupling elements in position by mounting elements. In a preferred embodiment, a mounting element 14 is used for holding the respective coupling elements 2, 3 and 4 in position, which mounting element is joined to the coupling elements in the shaded areas 13, in such a manner that it is produced integrally with these elements, and thus, may be formed as of one piece in the injection molding process.

As noted above, it is possible to move the coupler connections of the optical wave guides, and thus the optical wave guides themselves, parallel to the adjoining coupler faces and in the direction of the arrow 11 in order to vary the splitter ratio. FIG. 4 shows a three-way star splitter in which the optical wave guides 7 and 9 are moved in the direction of the arrow 11 towards the optical wave guide 8. If, as shown in FIG. 4, the optical wave guide 7 is implemented as a transmitter, the optical wave guide 9 as a receiver and the optical wave guide 8 as a transmitter/receiver, a Y-coupler is produced. In this arrangement, the "cross talk component"15 (information part coupled out) transmitted via the coupling element 4 from the optical wave guide 7 to the optical wave guide 9 can be arbitrarily varied and, for example, allows for simple functional monitoring of the transmitter (optical wave guide 7).

If the optical wave guides 7 and 9 were to be moved in the opposite direction 11', an input coupling element would be obtained in which only a small part of the signal energy propagated from optical wave guide 7 to optical wave guide 9 is redirected to the optical wave guide 8.

Thus, the bidirectional three-way star splitter according to the invention represents a universal element which provides for a branching point having three equal-priority connections, a Y-coupler, a branching element, and, by combining various star splitters, bidirectional branching.

Although the present invention has been desribed and illustrated in detail, it is to be clearly understood that the same is by way of illustration and example only, and is not to be taken by way of limitation. The spirit and scope of the present invention are to be limited only by the terms of the appended claims.

I claim:

1. Bidirectional three-way splitter arrangement for a plurality of optical wave guide means, each of said wave guide means having an optical axis and a front-end face, said splitter arrangement comprising;
    plural coupling element means each optically coupled between two of the plurality of optical wave guide means and each having a longitudinal inside surface and a longitudinal outside surface, said longitudinal inside and outside surfaces of each coupling element being joined at both ends by a planar coupling surface, said planer coupling surface extending parallel to the front-end face of the respectively adjoining wave guide means and forming an enclosed acute angle with the respective adjoining longitudinal inside surface, and wherein each said longitudinally inside surface includes a plane reflector means and each said longitudinal outside includes an elliptical reflector means.

2. The arrangement of claim 1, wherein the respective longitudinal inside surfaces of at least two of said coupling element means are abuttingly joined with each other and define lines of intersection at the respective abutments which are aligned with said optical axis of said respectively adjoining wave guide means.

3. The arrangement according to claim 2, wherein at least one of said coupling element means comprises plane-parallel glass.

4. The arrangement according to claim 2, wherein at least one of the coupling element means comprises synthetic glass of homogeneous composition.

5. The arrangement according to claim 1, wherein the respective longitudinal inside surfaces of said coupling element means form an equilateral triangle.

6. The arrangement according to claim 1, wherein the contour of said elliptical reflector means provides:
    (a) an aperture angle of the cone of radiation of an incident light beam which is approximately equal to an aperture angle of the cone of radiation of the corresponding reflected light beam; and
    (b) a mean object distance which is approximately equal to the respective mean image distance; and
    (c) wherein the reflection of said light rays occur as a total internal reflection.

7. The arrangement of claim 6, wherein the contour of said elliptical reflector means is determined by the numeric aperture of the optical wave guide and the refractive index n of the material of the respective coupling element means.

8. The arrangement of claim 7, wherein said elliptical reflector means provides a focal point at the respectively adjoining wave guide means and wherein said respective plane reflector means is arranged between the respective focal point and said elliptical reflector means.

9. The arrangement of claim 8, wherein said elliptical reflector means further provides a reflected focal point on said respective planar coupling surface.

10. The arrangement according to claim 9, wherein the reflection in said coupling element means occurs as a total internal reflection.

11. The arrangement according to claim 1, wherein at least one of said optical wave guide means has core of a known diameter and wherein said respective coupling element means has a thickness approximately equal to said core diameter of said at least one optical wave guide means.

12. The arrangement to claim 1, wherein at least one of said optical wave guide means has a core of a known diameter and wherein said respective longitudinal inside surface has a length which is a multiple of said core diameter of said at least one optical wave guide means.

13. The arrangement according to claim 12, wherein the length of said respective longitudinal inside surface is between 8 to 15 times the core diameter of said at least one optical wave guide means.

14. The arrangement according to claim 1, wherein at least two of said plurality of optical wave guides means are identical.

15. The arrangement according to claim 1, wherein at least one coupler connecting means can be moved parallel to the respective adjoining planar coupling surfaces of respective coupling elements means for varying the splitter ratio.

16. The arrangement according to claim 1, wherein all said coupling element means are integrally joined to each other as a single molded part.

17. The arrangement according to claim 16, wherein all said coupling element means are integrally joined to each other at respective lines of intersection.

18. The arrangement according to claim 1, further including a connecting piece extending from two planar coupling surfaces in the direction of the respective optical wave guide means, and is positioned with respect to its respective wave guide by a coupler connection means.

19. The arrangement according to claim 18, wherein said connecting piece comprises synthetic glass.

20. The arrangement according to claim 18, wherein the connecting piece is integrally joined to the respective planar coupling surfaces of the abuttingly adjoined coupling elements.

21. The arrangement according to claim 18, wherein the outside dimensions of the connecting piece correspond at least to the diameter of the core of the respective optical wave guide means and at a maximum to the diameter of the sheath of the respective optical wave guide means.

22. The arrangement according to claim 18, wherein the connecting piece is centered with respect to the respectively adjoining optical wave guide means by a coupler connection means.

23. The arrangement according to claim 18, wherein the connecting piece is cascadedly connected to another three-way star splitter arrangement for providing branching.

24. The arrangement according to claim 5, wherein at least one of the coupling elements means is held in place by means of connecting elements arranged outside the cones of radiation of light beams entering or leaving the splitter, said connecting elements means being integrally joined to the coupling elements means.

25. The arrangement according to claim 1, wherein said splitter arrangement included three coupling element means integrally joined to each other as a single molded part.

26. The arrangement according to claim 25, wherein the respective longitudinal inside surfaces of said three coupling element means form an equilateral triangle.

* * * * *